(12) United States Patent
Wollenweber (10) Patent No.: US 12,488,435 B2
(45) Date of Patent: Dec. 2, 2025

(54) SYSTEM AND METHOD FOR ON-THE-FLY NOISE EQUIVALENT COUNT ESTIMATION FOR POSITRON EMISSION TOMOGRAPHY IMAGING

(71) Applicant: GE Precision Healthcare LLC, Wauwatosa, WI (US)

(72) Inventor: Scott David Wollenweber, Waukesha, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 322 days.

(21) Appl. No.: 18/315,946

(22) Filed: May 11, 2023

(65) Prior Publication Data

US 2024/0378705 A1   Nov. 14, 2024

(51) Int. Cl.
*G06T 5/70* (2024.01)
*A61B 6/03* (2006.01)
(Continued)

(52) U.S. Cl.
CPC ............... *G06T 5/70* (2024.01); *A61B 6/032* (2013.01); *A61B 6/4291* (2013.01); *G06T 11/005* (2013.01)

(58) Field of Classification Search
CPC ... G06T 5/70; G06T 11/005; G06T 2211/428; G06T 2211/441; G06T 2211/452;
(Continued)

(56) References Cited

U.S. PATENT DOCUMENTS

2005/0129170 A1* 6/2005 Watson .................. G01T 7/005
378/5
2010/0148047 A1   6/2010 Bendriem
(Continued)

OTHER PUBLICATIONS

Couceiro, Miguel, et al. "Scatter fraction, count rates, and noise equivalent count rate of a single-bed position RPC TOF-PET system assessed by simulations following the Nema NU2-2001 standards." IEEE Transactions on Nuclear Science 61.3 (2014): 1153-1163.*
(Continued)

*Primary Examiner* — Shefali D Goradia
(74) *Attorney, Agent, or Firm* — Fletcher Yoder, P.C.

(57) ABSTRACT

A method for estimating noise equivalent counts includes one or more times during a scan of an object with a positron emission tomography (PET) scanner, wherein a plurality of coincidence events are detected by a detector array of the PET scanner, performing the following actions. The actions include obtaining a total of the plurality of coincidence events, estimating random coincidence events, and estimating scatter coincidence events. The actions include estimating true coincidence events based on the total of the plurality of coincidence events, the estimated random coincidence events, and the estimated scatter coincidence events. The actions include determining a scatter fraction based on the estimated scatter events and true coincidence events. The actions include estimating the noise equivalent counts based at least on the scatter fraction, the total of the plurality of coincidence events, the estimated true coincidence events, the estimated scatter coincidence events, and the estimated random coincidence events.

18 Claims, 9 Drawing Sheets

(51) Int. Cl.
*A61B 6/42* (2024.01)
*G06T 11/00* (2006.01)

(58) Field of Classification Search
CPC ....... A61B 6/032; A61B 6/4291; A61B 6/037; A61B 6/5282
See application file for complete search history.

(56) References Cited

U.S. PATENT DOCUMENTS

| | | | | |
|---|---|---|---|---|
| 2024/0185485 | A1* | 6/2024 | Salomon | G06T 11/006 |
| 2024/0265593 | A1* | 8/2024 | Liu | A61B 6/032 |
| 2025/0052913 | A1* | 2/2025 | Panin | G06T 11/005 |

OTHER PUBLICATIONS

Stearns, Charles W., and Daniel C. Wack. "A noise equivalent counts approach to transmission imaging and source design." IEEE transactions on medical imaging 12.2 (1993): 287-292.*

Andrew P. Leynes et al: "Hybrid ZTE/Dixon 4 MR-based attenuation correction for quantitative uptake estimation of pelvic lesions in PET/MRI", Medical Physics., vol. 44, No. 3, Mar. 16, 2017 (Mar. 16, 2017), pp. 902-913, XP055497672, US ISSN: 0094-2405, DOI: 10.1002/mp.12122.

EP application 24173087.8 filed Apr. 29, 2024—Search Report issued Sep. 27, 2024; 9 pages.

Laurent Baptiste et al: "PET scatter estimation using deep learning U-Net architecture", Mar. 10, 2023, vol. 68, No. 6, Mar. 10, 2023 (Mar. 10, 2023), XP020458660, DOI: 10.1088/1361-6560/AC9A97; [retrieved on Mar. 10, 2023].

Strother et al., "Measuring PET Scanner Sensitivity: Relating Countrates to Image Signal-to-Noise Ratios using Noise Equivalent Counts," IEEE Transactions on Nuclear Science, vol. 37, No. 2, Apr. 1990, 6 pgs.

Chang et al., "Effects of injected dose, BMI and scanner type on NECR and image noise in PET imaging," Institute of Physics and Engineering in Medicine, Physics in Medicine and Biology, vol. 56, 2011, 12 pgs.

Lartizien et al., "Optimization of Injected Dose Based on Noise Equivalent Count Rates for 2- and 3-Dimensional Whole-Body PET," The Journal of Nuclear Medicine, vol. 43, No. 9, Sep. 2002, 12 pgs.

Ronneberger et al., "U-Net: Convolutional Networks for Biomedical Image Segmentation," arXiv:1505.,04597vl, May 18, 2015, 8 pgs.

Jain et al., "Determining optimal F18-FDG dose in clinical whole body PET acquisitions using Acquisition-Specific NEC", Society of Nuclear Medicine and Molecular Imaging Annual Meeting, Jun. 10-14, 2017, Denver, Colorado, 7 pgs.

Stearns, "NEC and Local Image Noise in PET Imaging," IEEE, 2004, 3 pgs.

* cited by examiner

SYSTEM AND METHOD FOR ON-THE-FLY NOISE EQUIVALENT COUNT ESTIMATION FOR POSITRON EMISSION TOMOGRAPHY IMAGING

BACKGROUND

The subject matter disclosed herein relates to imaging systems, and more particularly to positron emission tomography (PET) imagining systems.

A PET imaging system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons (known as (2) singles) are detected by detectors that are placed along the line of response on a detector ring. When these photons arrive and are detected at the detector elements at the same time, this is referred to as coincidence or coincidence event (COIN). An image is then generated, based on the acquired data that includes the annihilation photon detection information.

The concept of noise equivalent counts relates count rates of true coincidence events, random coincidence events, and scatter coincidence events to the signal-to-noise in a PET image. While originally derived for use with reconstruction with filtered backprojection, noise equivalent counts have also been applied to more modern iterative reconstruction methods in current clinical systems. Noise equivalent counts have also been used to learn about optimization of scan protocols and injected dose. However, the use of noise equivalent counts has been limited to applications utilized after the PET scan. One of the reasons for the limited use of noise equivalent counts is the inability to estimate scatter coincidence events during a PET scan.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for estimating noise equivalent counts is provided. The method includes one or more times during a scan of an object with a positron emission tomography (PET) scanner, wherein a plurality of coincidence events are detected by a detector array of the PET scanner, performing the following actions. The actions include obtaining, via a processor, a total of the plurality of coincidence events detected by the detector array. The actions also include estimating, via the processor, random coincidence events detected by the detector array. The actions further include estimating, via the processor, scatter coincidence events detected by the detector array. The actions even further include estimating, via the processor, true coincidence events detected by the detector array based on the total of the plurality of coincidence events, the estimated random coincidence events, and the estimated scatter coincidence events. The actions yet further include determining, via the processor, a scatter fraction based on the estimated scatter events and the estimated true coincidence events. The actions still further include estimating, via the processor, the noise equivalent counts based at least on the scatter fraction, the total of the plurality of coincidence events, the estimated true coincident events, the estimated scatter coincidence events, and the estimated random coincidence events.

In another embodiment, a system for estimating noise equivalent counts is provided. The system includes a memory encoding processor-executable routines. The system also includes a processor configured to access the memory and to execute the processor-executable routines, wherein the processor-executable routines, when executed by the processor, cause the processor to one or more times during a scan of an object with a positron emission tomography (PET) scanner, wherein a plurality of coincidence events are detected by a detector array of the PET scanner, perform the following actions. The actions include obtaining a total of the plurality of coincidence events detected by the detector array. The actions also include estimating random coincidence events detected by the detector array. The actions further include estimating scatter coincidence events detected by the detector array. The actions even further include estimating true coincidence events detected by the detector array based on the total of the plurality of coincidence events, the estimated random coincidence events, and the estimated scatter coincidence events. The actions yet further include determining a scatter fraction based on the estimated scatter events and the estimated true coincidence events. The actions still further include estimating the noise equivalent counts based at least on the scatter fraction, the total of the plurality of coincidence events, the estimated true coincident events, the estimated scatter coincidence events, and the estimated random coincidence events.

In a further embodiment, a non-transitory computer-readable medium is provided. The computer-readable medium includes processor-executable code that when executed by a processor, causes the processor one or more times during a scan of an object with a positron emission tomography (PET) scanner, wherein a plurality of coincidence events are detected by a detector array of the PET scanner, to perform the following actions. The actions include obtaining a total of the plurality of coincidence events detected by the detector array. The actions also include generating an emission sinogram based on the plurality of coincidence events. The actions further include estimating random coincidence events detected by the detector array and generating a random sinogram based on the estimated random coincidence events. The actions even further include estimating scatter coincidence events detected by the detector array by inputting the emission sinogram and an attenuation correction factor sinogram into a trained deep learning-based scatter estimation model and outputting from the deep learning-based scatter estimation model a scatter sinogram. The actions yet further include determining the estimated random coincidence events that have passed through the object during the scan by applying a pre-computed mask of the object to the random sinogram, wherein the pre-computed mask is in sinogram space. The actions still further include determining the estimated scatter coincidence events that have passed through the object during the scan by applying the pre-computed mask to the scatter sinogram. The actions further include estimating true coincidence events detected by the detector array based on the total of the plurality of coincidence events, the estimated random coincidence events, and the estimated scatter coincidence events. The actions even further include determining a scatter fraction based on the estimated scatter events and the estimated true coincidence events. The actions still further include estimating noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, transformer networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore, potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

A variety of coincidence events occur during a PET scan. True coincidence events occur when both photons from an annihilation event are detected by detectors in coincidence, neither photon undergoes any form of interaction prior to detection, and no other event is detected within the coincidence time window. Random coincidence events occur when two photons not arising from the same annihilation event are incident on the detectors within the coincidence time window of the system. The number of random coincidences in a given LOR is closely linked to the rate of single events measured by the detectors joined by that LOR and the rate of random coincidences increase roughly with the square of the activity in the field of view (FOV). Scatter coincidence events occur when at least one of the detected photons has undergone at least one Compton scattering event prior to detection. The direction and energy of the photon is changed during the Compton scattering process, making it highly likely that the resulting coincidence event will be assigned to the wrong LOR. Scatter coincident events add background to the estimated true coincidence events and add statistical noise to the signal.

Various embodiments provide a system and method for estimating noise equivalent counts on-the-fly or in real time (i.e., during the scan as the data is collected or acquired). In particular, the disclosed embodiments provide a way to rapidly estimate scatter coincidence events on-the-fly or in real time (i.e., during the scan) to enable estimating noise equivalent counts during the scan. In particular, the disclosed embodiments include one or more times during a scan of an object with a positron emission tomography (PET) scanner, wherein a plurality of coincidence events are detected by a detector array of the PET scanner, performing a number of actions. The actions include obtaining a total of the plurality of coincidence events detected by the detector array. The actions also include estimating random coincidence events detected by the detector array. The actions further include estimating scatter coincidence events detected by the detector Array. The actions even further include estimating true coincidence events detected by the detector array based on the total of the plurality of coincidence events, the estimated random coincidence events, and the estimated scatter coincidence events. The actions yet further include determining a scatter fraction based on the estimated scatter events and the estimated true coincidence events. The actions still further include estimating the noise equivalent counts based at least on the scatter fraction, the total of the plurality of coincidence events, the estimated true coincidence events, the estimated scatter coincidence events, and the estimated random coincidence events.

In certain embodiments, the disclosed embodiments include obtaining (prior to or during the scan) a pre-computed mask of the object imaged during the scan, wherein the pre-computed mask is in sinogram space. In certain embodiments, the pre-computed mask is obtained from a computed tomography scan of the object. In certain embodiments, the pre-computed mask was obtained from processed PET attenuation correction images (PIFA) of the object obtained by converting magnetic resonance (MR) images of the object acquired using MR sequences including zero echo time and Dixon.

In certain embodiments, during the scan and when the pre-computed masked is to be utilized, the following actions may occur. These actions include generating a random sinogram based on the estimated random coincidence events (e.g., utilizing a random from singles algorithm), generating a scatter sinogram based on the estimated scatter coincidence events (e.g., estimated utilizing a trained deep learning-based scatter estimation model as noted below), determining the estimated random coincidence events that have passed through the object during the scan based at least on the random sinogram, and determining the estimated scatter coincidence events that have passed through the object during the scan based at least on the scatter sinogram. Determining the estimated random coincidence events that have passed through the object during the scan includes applying the pre-computed mask to the random sinogram. Determining the estimated scatter coincidence events that have passed through the object during the scan includes applying the pre-computed mask to the scatter sinogram. In certain embodiments, both the random sinogram and scatter sinogram are down-sampled (e.g., by a factor of 2, 4, 8 or another factor) prior to determining the estimated random coincidence events and the estimated scatter coincidence events that have passed through the object during the scan (e.g., to increase speed and efficiency). In certain embodiments, during the scan and when the pre-computed masked is to be utilized, estimating the noise equivalent counts includes estimating the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan.

Whether a pre-computed mask is utilized or not, the disclosed embodiments include the estimating scatter coincidence events (and generating the scatter sinogram) include utilizing a trained deep learning-based scatter estimation model. The disclosed embodiments include generating both an emission sinogram based on the plurality of coincidence events. The disclosed embodiments include obtaining an attenuation correction sinogram (e.g., u-map) from a separate scan (e.g., CT scan) of the object to be imaged. The disclosed embodiments include inputting both the emission sinogram and the attenuation correction factor sinogram into trained deep learning-based scatter estimation model and outputting from the deep learning-based scatter estimation model the scatter sinogram. In certain embodiments, the emission sinogram and the attenuation correction factor sinogram are down-sampled (e.g., by a factor of 2, 4, 8 or another factor) prior to input into the deep learning-based scatter estimation model, thus, the scatter sinogram is also down-sampled (e.g., to increase speed and efficiency). In certain embodiments, the deep learning-based scatter estimation model may be trained (e.g., via supervised learning) to generate a scatter sinogram based on inputting a target of scatter estimates (e.g., model-based scatter estimates or Monte Carlo based scatter estimates) and both emission sinograms and attenuation correction factor sinograms (e.g., training data) obtained from clinical examination data and/or phantom data into a neural network. In certain embodiments, both the emission sinograms and the attenuation correction factor sinograms are down-sampled (e.g., by a factor of 2, 4, 8 or another factor to increase speed and efficiency) prior to being inputted into the neural network for training.

The gathering of the various data for estimating the noise equivalent counts and estimating the noise equivalent counts during the scan may occur periodically during the scan according to a set interval (e.g., 1, 2, 3, 4, 5, 6, 7, 8, 9, or 10 or more seconds). This minimizes computing resource requirements. The noise equivalent counts estimated during the scan may be utilized to inform the scan protocol in real time (e.g., as it is occurring) or to modify scan parameters in real time.

The disclosed embodiments enable a site to have more real time information for predicting image quality. In addition, the disclosed embodiments provide more real time data quality information to inform a site on how to modify scan procedures. Further, the disclosed embodiments can be utilized as part of a predictive model to determine per-body-segment imaging time based on the on-the-fly data estimation (i.e., estimated noise equivalent counts) given input of a protocol-based set of constraints on duration per location.

Figure 1:
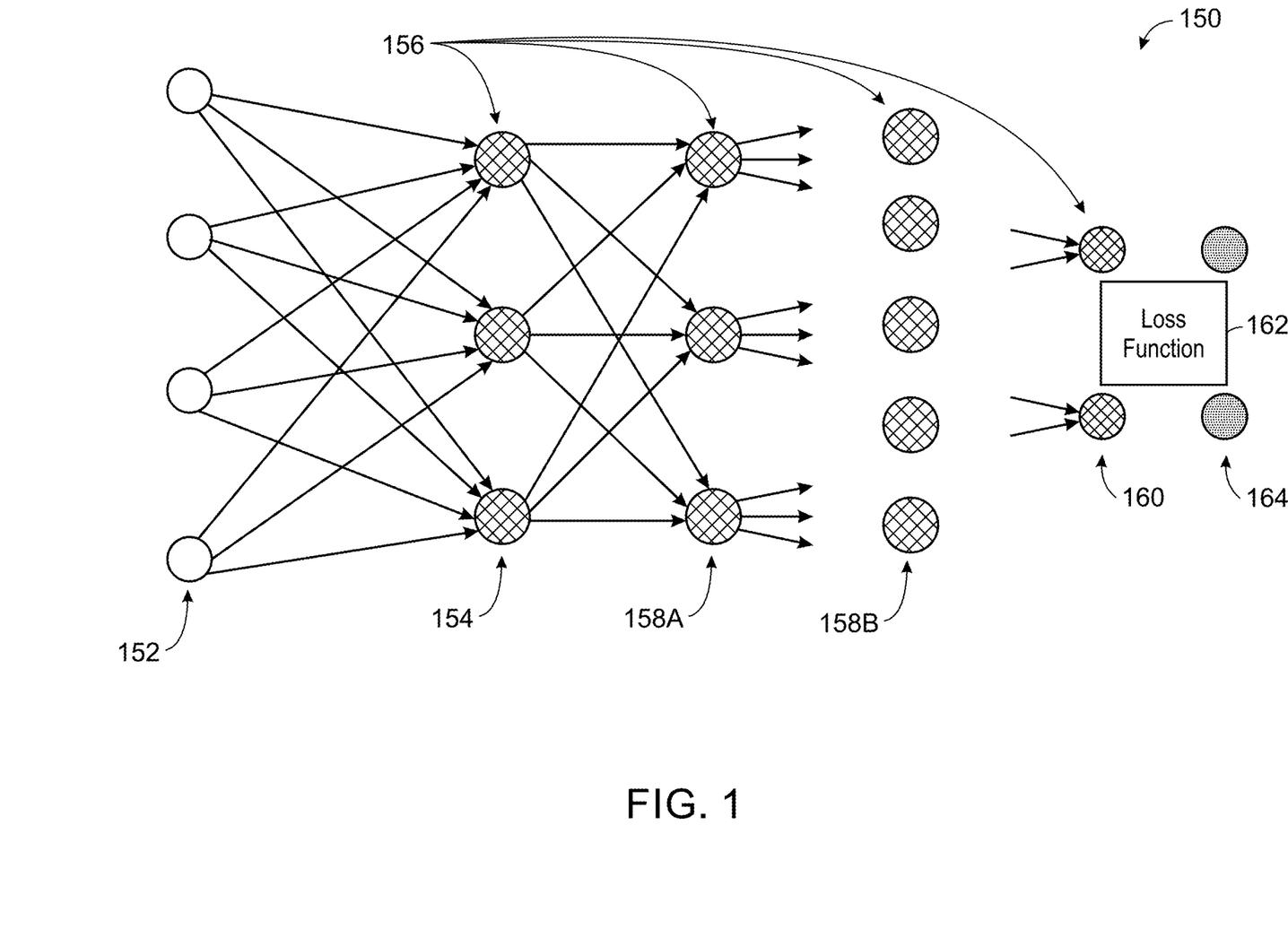
FIG. 1 depicts an example of an artificial neural network for training a deep learning model, in accordance with aspects of the present disclosure.

With the preceding in mind, FIG. 1 schematically depicts an example of an artificial neural network 150 that may be trained as a deep learning model as discussed herein. In this example, the network 150 is multi-layered, with a training input 152 and multiple layers including an input layer 154, hidden layers 158A, 158B, and so forth, and an output layer 160 and the training target 164 present in the network 150. Each layer, in this example, is composed of a plurality of "neurons" or nodes 156. The number of neurons 156 may be constant between layers or may vary from layer to layer. Neurons 156 at each layer generate respective outputs that serve as inputs to the neurons 156 of the next hierarchical layer. In practice, a weighted sum of the inputs with an added bias may be computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 160 which, in conjunction with training target 164, are used to compute some loss or error function 162, which will be backpropagated to guide the network training.

The loss or error function 162 measures the difference or similarity between the network output and the training target. In certain implementations, the loss function may be a derived mean squared error (MSE). In others it could be the overlap ratio. Alternatively, the loss function 162 could be defined by other metrics associated with the particular task in question, such as a Dice (overlap measure) function or score.

Figure 2:
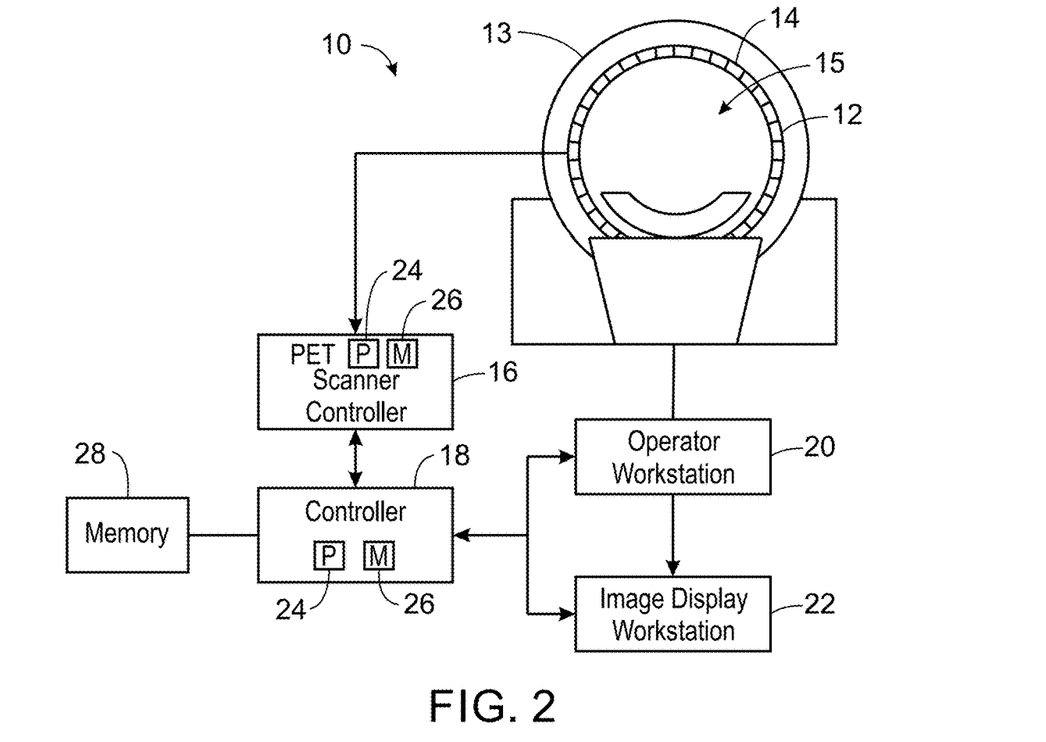
FIG. 2 is a diagrammatical representation of an embodiment of a positron emission tomography (PET) imaging system, in accordance with aspects of the present disclosure.

FIG. 2 depicts a PET imaging system 10 operating in accordance with certain aspects of the present disclosure. The PET imaging system of FIG. 2 may be utilized with a dual-modality imaging system such as a PET/CT imaging or PET/MRI imaging.

Returning now to FIG. 2, the depicted PET imaging system 10 includes a detector array 12. The detector array 12 of the PET imaging system 10 typically includes a number of detector modules or detector channels (generally designated by reference numeral 14) arranged in one or more rings, as depicted in FIG. 2. Each detector module 14 may include a scintillator block (e.g., having a plurality of scintillation crystals) and a photomultiplier tube (PMT) or other light sensor or photosensor (e.g. silicon avalanche photodiode, solid state photomultiplier, etc.). In certain embodiments, a respective photosensor is associated with a respective scintillator crystal. The PET imaging system 10 includes a gantry 13 that is configured to support a full ring annular detector array 12 thereon. The detector array 12 is positioned around the central opening/bore 15 and can be controlled to perform a normal "emission scan" in which positron annihilation events are counted. To this end, the detector modules 14 forming the detector array 12 generally generate intensity output signals corresponding to each annihilation photon (which are acquired by acquisition circuitry coupled to the detector modules 14).

The depicted PET imaging system 10 also includes a PET scanner controller 16, a controller 18, an operator workstation 20, and an image display workstation 22 (e.g., for displaying an image). In certain embodiments, the PET scanner controller 16, controller 18, operator workstation 20, and image display workstation 22 may be combined into a single unit or device or fewer units or devices.

The PET scanner controller 16, which is coupled to the detector array 12, may be coupled to the controller 18 to enable the controller 18 to control operation of the PET scanner controller 16. Alternatively, the PET scanner controller 16 may be coupled to the operator workstation 20 which controls the operation of the PET scanner controller 16. In operation, the controller 18 and/or the workstation 20 controls the real-time operation of the PET imaging system 10. One or more of the PET scanner controller 16, the controller 18, and/or the operation workstation 20 may include a processor 24 and/or memory 26. In certain embodiments, the PET imaging system 10 may include a separate memory 28. The detector 12, PET scanner controller 16, the controller 18, and/or the operation workstation 20 may include detector acquisition circuitry for acquiring image data from the detector array 12 and image reconstruction and processing circuitry for image processing. The circuitry may include specially programmed hardware, memory, and/or processors.

The processor 24 may include multiple microprocessors, one or more "general-purpose" microprocessors, one or more special-purpose microprocessors, and/or one or more application specific integrated circuits (ASICS), system-on-chip (SoC) device, or some other processor configuration. For example, the processor 24 may include one or more reduced instruction set (RISC) processors or complex instruction set (CISC) processors. The processor 24 may execute instructions to carry out the operation of the PET imaging system 10. These instructions may be encoded in programs or code stored in a tangible non-transitory computer-readable medium (e.g., an optical disc, solid state device, chip, firmware, etc.) such as the memory 26, 28. In certain embodiments, the memory 26 may be wholly or partially removable from the controller 16, 18.

As discussed in greater detail below, the processor 24 is configured to obtain a pre-computed mask of the imaged object, wherein the pre-computed mask is in sinogram space (e.g., prior to or during a scan). The processor 24 is also configured to obtain a total of the plurality of coincidence events detected by the detector array. The processor 24 is further configured to estimate random coincidence events detected by the detector array. The processor 24 is even further configured to estimate scatter coincidence events detected by the detector array and generating a random sinogram. The scatter coincidence events may be estimated and the random sinogram generated utilizing a deep learning-based scatter estimation model.

The processor 24 is yet further configured to determine (estimate) true coincidence events detected by the detector array based on the total of the plurality of coincidence events, the estimated random coincidence events, and the estimated scatter coincidence events. The estimated true coincidence events are determined by subtracting both the estimated random coincidence events and the estimated scatter coincidence events from the total of the plurality of coincidence events. The processor 24 is still further configured to determine a scatter fraction based on the estimated scatter events and the estimated true coincidence events. The scatter fraction is determined by dividing the estimated scatter events by the sum of both the estimated scatter events and the estimated true coincidence events.

The processor 24 is even further configured to generate a 'randoms' sinogram based on the estimated random coincidence events. The processor 24 is yet further configured to determine the estimated random coincidence events that passed through the object during the scan by applying the pre-computed mask to the random sinogram. The processor 24 is even further configured to determine the estimated scatter coincidence events that passed through the object during the scan by applying the pre-computed mask to the scatter sinogram.

The processor 24 is still further configured estimate the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan. The processor 24 is even further configured to utilize the estimated noise equivalent counts to modify a scan protocol or one or more scan parameters of the scan as the scan is occurring.

By way of example, PET imaging is primarily used to measure metabolic activities that occur in tissues and organs and, in particular, to localize aberrant metabolic activity. In PET imaging, the patient is typically injected with a solution that contains a radioactive tracer. The solution is distributed and absorbed throughout the body in different degrees, depending on the tracer employed and the functioning of the organs and tissues. For instance, tumors typically process more glucose than a healthy tissue of the same type. Therefore, a glucose solution containing a radioactive tracer may be disproportionately metabolized by a tumor, allowing the tumor to be located and visualized by the radioactive emissions. In particular, the radioactive tracer emits positrons that interact with and annihilate complementary electrons to generate pairs of annihilation photons. In each annihilation reaction, two annihilation photons traveling in opposite directions are emitted. In a PET imaging system 10, the pair of annihilation photons are detected by the detector array 12 configured to ascertain that two annihilation photons detected sufficiently close in time are generated by the same annihilation event. Due to the nature of the annihilation event, the detection of such a pair of annihilation photons may be used to determine the line of response (LOR) along which the annihilation photons traveled before impacting the detector, allowing localization of the annihilation event to that line. By detecting a number of such annihilation photon pairs, and calculating the corresponding lines traveled by these pairs, the concentration of the radioactive tracer in different parts of the body may be estimated and a tumor, thereby, may be detected. Therefore, accurate detection and localization of the annihilation photons forms a fundamental and foremost objective of the PET imaging system 10.

Figure 3:
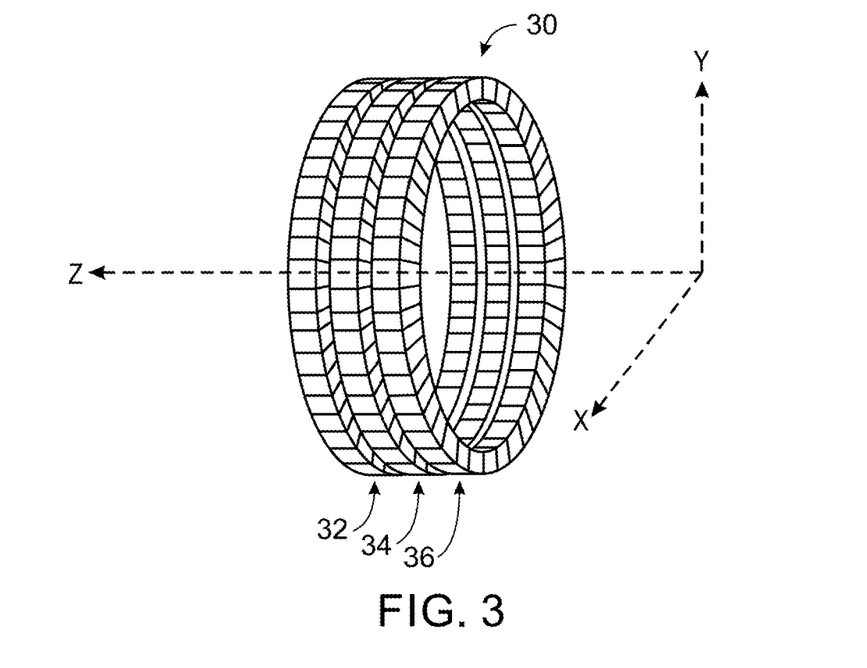
FIG. 3 is a schematic diagram of an embodiment of a 3-D PET scanner, in accordance with aspects of the present disclosure.

Data associated with coincidence events along a number of LORs may be collected and further processed to reconstruct two-dimensional (2-D) tomographic images. Most modern PET scanners can operate in a 3-D mode, where coincidence events from different detector rings positioned along the axial direction are counted to obtain 3-D tomographic images. For example, a PET scanner 30 with multiple detector rings is shown in FIG. 3, where the individual detectors and photosensors are not shown. As shown, the PET scanner 30 includes three detector rings 32, 34 and 36. The number of detector rings may vary (e.g., 2, 3, 4, 5, or more detector rings). In the disclosed embodiments, coincidence events may occur in different detector rings of different gantry segments of the modular gantry along the axial direction.

Figure 4:
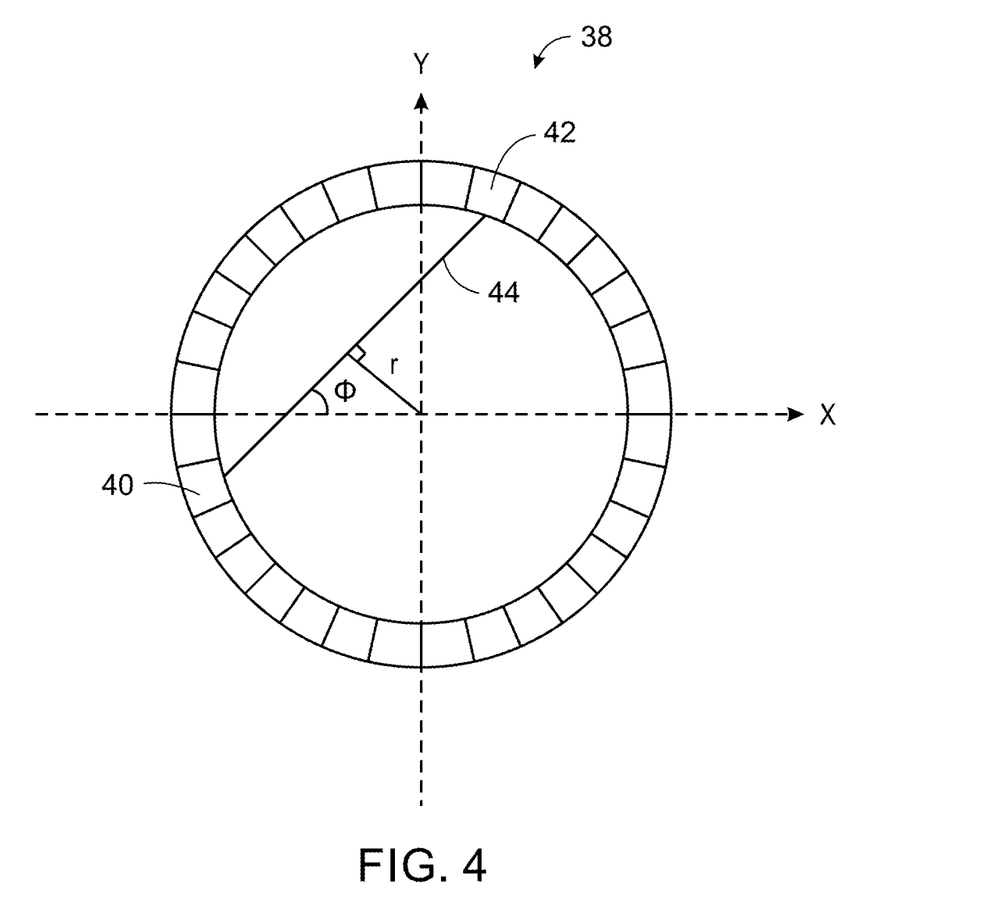
FIG. 4 is a schematic diagram of a line of response (LOR) in a PET imaging system, in accordance with aspects of the present disclosure.

Traditionally, data associated with coincidence events are stored in the form of sinograms based on their corresponding LORs. For example, in a 2-D PET scanner 38 like the one illustrated in FIG. 4, if a pair of coincidence events are detected by two opposite detectors 40 and 42, an LOR may be established as a straight line 44 linking the two detectors 40, 42. This LOR may be identified by two coordinates (r, φ), wherein r is the radial distance of the LOR from the center axis of the detector ring 30, and φ is the trans-axial angle between the LOR and the X-axis. The detected coincidence events may be recorded in a 2-D matrix λ(r, φ). As the PET scanner continues to detect coincidence events along various LORs, these events may be binned and accumulated in their corresponding elements in the matrix λ(r, φ). The result is a 2-D sinogram λ(r, φ), each element of which holds an event count for a specific LOR. In a 3-D PET scanner, an LOR is defined by four coordinates (r, φ, θ, z), wherein the third coordinate θ is the axial angle between the LOR and the center axis (or Z-axis as shown in FIG. 3) of the detector rings and z is the distance of the LOR from the center of the detector along the Z-axis. Typically, the third and fourth co-ordinates are combined into only one variable, v, which can define both θ and z coordinates. In this case, the detected coincidence events are stored in a 3-D sinogram λ(r, φ, v).

To compute noise equivalent counts, the estimated true coincidence events, the random coincidence events, and the scatter coincident events in the data to be used for image reconstruction need to be estimated. A mask of the imaged object (in projection space) is applied to the random coincidence events and the scatter coincidence events since those are the events that contribute to noise in the imaged object. In certain embodiments, in an estimate of noise equivalent counts, the mask may be ignored to simplify computation. As noted below, in certain embodiments, the mask can be pre-determined or pre-computed for application or to be ignored.

The equation estimating noise equivalent counts is as follows:

$$\frac{T^2}{T + S + kR} \tag{1}$$

where T represents true coincidence events, S represents scatter coincidence events, R represents random coincidence events, and k is 1 for randoms estimated from singles and 2 for randoms from delayed coincidence events.

Equation 1 may be rewritten as follows:

$$\frac{(1 - sf)^2(P - R)^2}{T + S' + R'} \tag{2}$$

where sf represents scatter fraction and equals S/(S+T), R' represents randoms that pass through the imaged object, and S' represents scatters that pass through the imaged object.

In certain embodiments, when an object mask is not to be utilized, Equation 2 may be rewritten as follows:

$$\frac{(1 - sf)^2(P - R)^2}{P - (1 - f)(R + S)} \tag{3}$$

where P represents the total prompts or total coincident events and f represents the fraction of the projected object. When the object mask is not available, f is 1 to simplify the equation.

Figure 5:
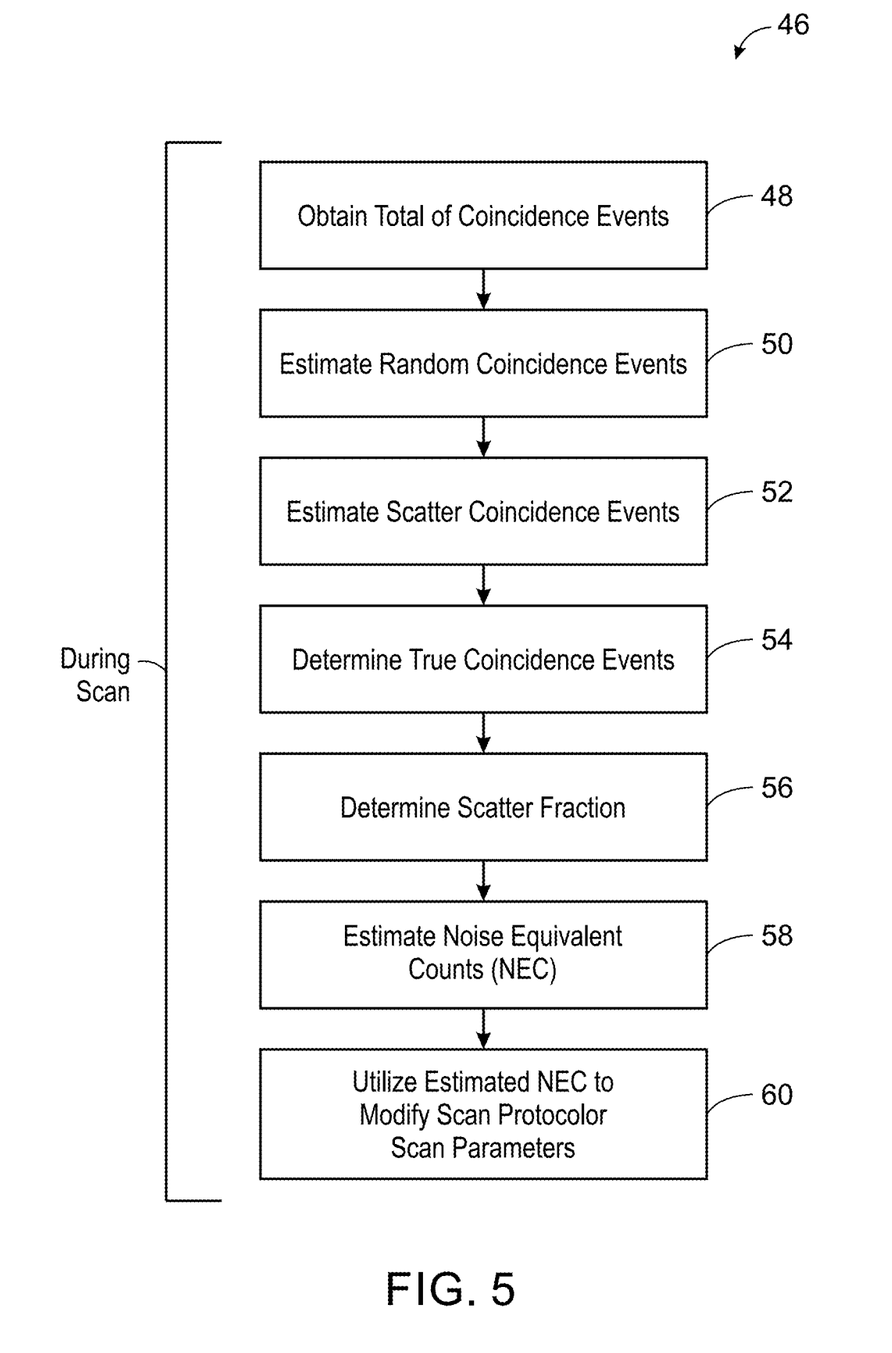
FIG. 5 is a flowchart of a method for estimating noise equivalent counts, in accordance with aspects of the present disclosure.

FIG. 5 is a flowchart of a method 46 for estimating noise equivalent counts. The method 46 may be performed by one or more components of the PET system 10 in FIG. 2 (acquisition circuitry, processing circuitry, etc.). One or more of the steps of the method 46 may be performed at a same time and/or in a different order from that depicted in FIG. 5.

As indicated in FIG. 5, the following steps of the method 46 occur one or more times during a scan (e.g., on-the-fly or in real time) of an object with a PET scanner (e.g., PET imaging system 10 in FIG. 2), where a plurality of coincidence events are detected by a detector array (e.g., detector array 12 in FIG. 2) of the PET scanner. In certain embodiments, the PET scanner includes a plurality of detectors rings disposed about a longitudinal axis of the PET scanner, where each detector includes a plurality of detectors.

The method 46 includes obtaining a total of the plurality of coincidence events detected by the detector array (block 48). The method 46 also includes estimating random coincidence events detected by the detector array (block 50). In certain embodiments, the random coincidence events are estimated utilizing a randoms from singles algorithm. The method 46 further includes estimating scatter coincidence events detected by the detector array (block 52). In certain embodiments, estimating scatter coincidence events includes utilizing a trained deep learning-based scatter estimation model to generate a scatter sinogram as described in greater detail below. The method 46 even further includes determining (estimating) true coincidence events detected by the detector array based on the total of the plurality of coincidence events, the estimated random coincidence events, and the estimated scatter coincidence events (block 54). The estimated true coincidence events are determined by subtracting both the estimated random coincidence events and the estimated scatter coincidence events from the total of the plurality of coincidence events. The method 46 yet further includes determining a scatter fraction based on the estimated scatter events and the estimated true coincidence events (block 56). The scatter fraction is determined by dividing the estimated scatter events by the sum of both the estimated scatter events and the estimated true coincidence events. The method 46 still further includes estimating the noise equivalent counts based at least on the scatter fraction, the total of the plurality of coincidence events, the estimated scatter coincidence events, and the estimated random coincidence events (block 58). For example, one of the equations noted above (e.g., equations 1, 2, and 3) are utilized in estimating the noise equivalent counts. In the absence of an object mask, equation 3 may be utilized. The method 46 yet further includes utilizing the estimated noise equivalent counts to modify a scan protocol or one or more scan parameters of the scan as the scan is occurring (block 60).

Figure 6:
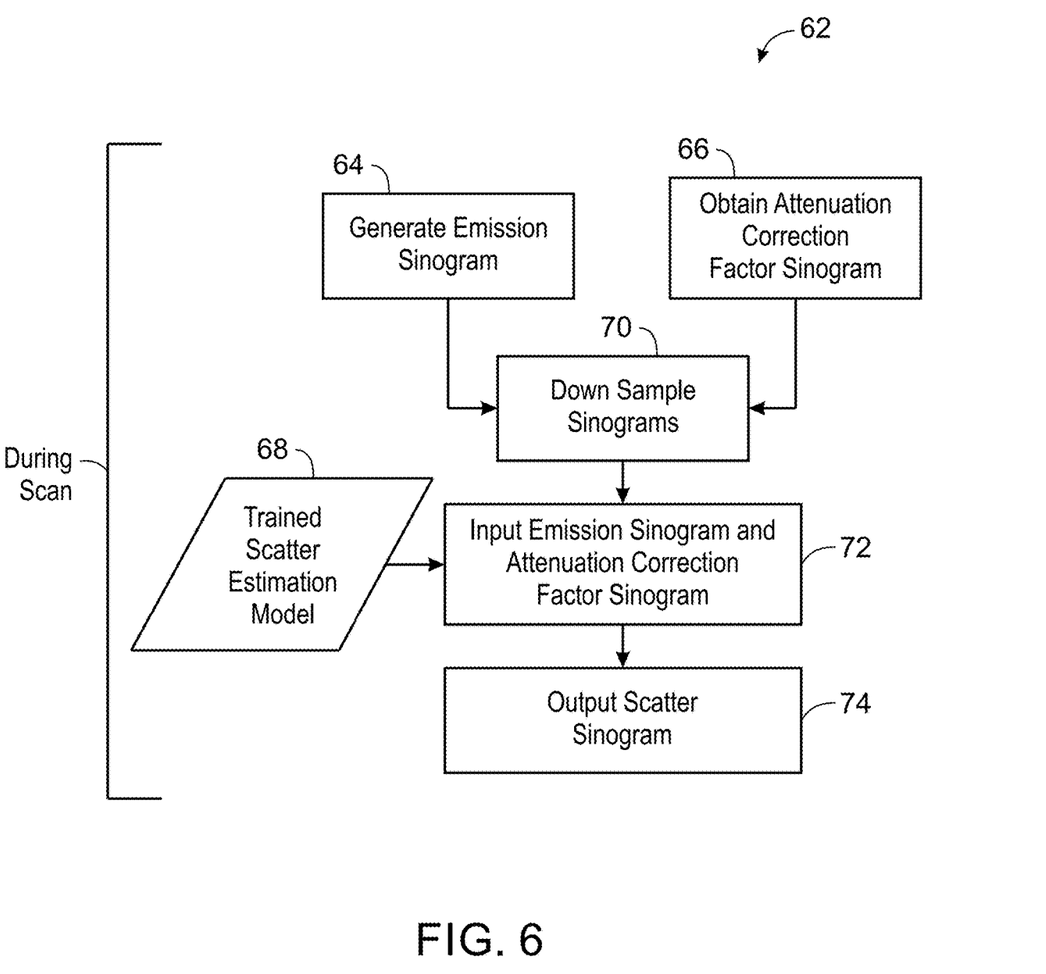
FIG. 6 is a flowchart of a method for estimating scatter coincidence events, in accordance with aspects of the present disclosure.

FIG. 6 is a flowchart of a method 62 for estimating scatter coincidence events. The method 62 may be performed by one or more components of the PET system 10 in FIG. 2 (acquisition circuitry, processing circuitry, etc.). One or more of the steps of the method 62 may be performed at a same time and/or in a different order from that depicted in FIG. 6.

As indicated in FIG. 6, the following steps of the method 62 occur one or more times during a scan (e.g., on-the-fly or in real time) of an object with a PET scanner (e.g., PET imaging system 10 in FIG. 2), where a plurality of coincidence events are detected by a detector array (e.g., detector array 12 in FIG. 2) of the PET scanner. In certain embodiments, the PET scanner includes a plurality of detectors rings disposed about a longitudinal axis of the PET scanner, where each detector includes a plurality of detectors.

The method 62 includes generating an emission sinogram based on the plurality of coincidence events detected by the detector array (block 64). The method 62 also includes obtaining an attenuation correction sinogram (e.g., u-map) of the image object (e.g., from a separate CT scan data of the object to be imaged) (block 66). The attenuation correction sinogram may be obtained during the scan or prior to the scan. In certain embodiments, the method 62 further includes downsampling (e.g., by a factor of 2, 4, 8 or another factor) both the emission sinogram and the attenuation correction sinogram prior to input into a trained deep learning-based scatter estimation model 68 to increase speed and efficiency (block 70). The method 62 even further inputting both the emission sinogram and the attenuation correction factor sinogram (in certain embodiments, down-sampled emission sinogram and down-sampled attenuation correction factor sinogram) into the trained deep learning-based scatter estimation model 68 (block 72). The method 62 yet further includes outputting from the deep learning-based scatter estimation model 68 a scatter sinogram (block 74). In certain embodiments, if both a down-sampled emission sinogram and a down-sampled attenuation correction factor sinogram are inputted into the deep learning-based scatter estimation model 68, the outputted scatter sinogram is down-sampled.

Figure 7:
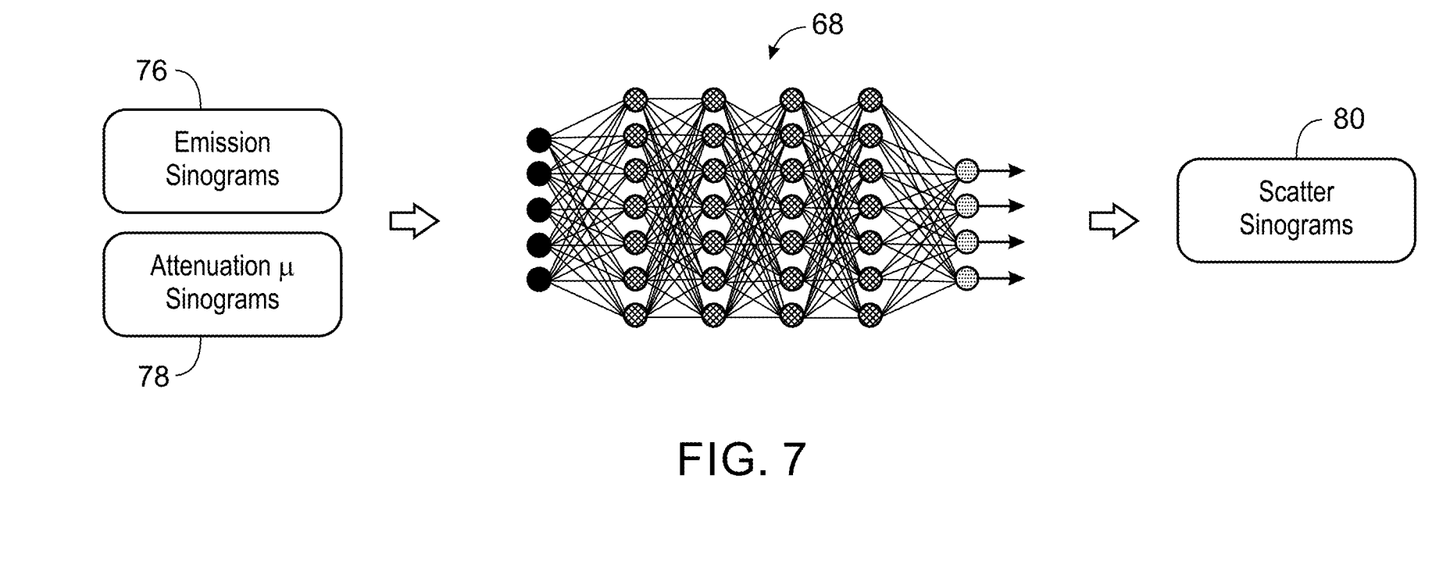
FIG. 7 is a schematic diagram for estimating scatter coincidence events utilizing a deep learning-based scatter estimation model, in accordance with aspects of the present disclosure.

FIG. 7 is a schematic diagram for estimating scatter coincidence events utilizing the deep learning-based scatter estimation model 68. As depicted in FIG. 7, an emission sinogram 76 (which represents dynamic data) and attenuation correction factor sinogram 78 (which represents static data) derived from the detected coincidence events into the deep learning-based scatter estimation model 68. The deep learning-based scatter estimation model 68 outputs a scatter sinogram 80 (e.g., scatter estimate). If the estimation of the scatter coincidence events occurs more than once during a scan, although the emission sinogram 76 is different, the attenuation correction factor sinogram 78 is the same. In other words, the attenuation correction factor sinogram 78 is only generated once and utilized with the different subsequent emission sinograms 76 as inputs into the deep learning-based scatter estimation model 68. In certain embodiments, the deep learning-based scatter estimation model 68 may utilize a U-NET architecture. Inferencing with the deep learning-based scatter estimation model 68 is fast (e.g., seconds), especially, if the data utilized is in a smaller dimension (e.g., down-sampled) space.

Figure 8:
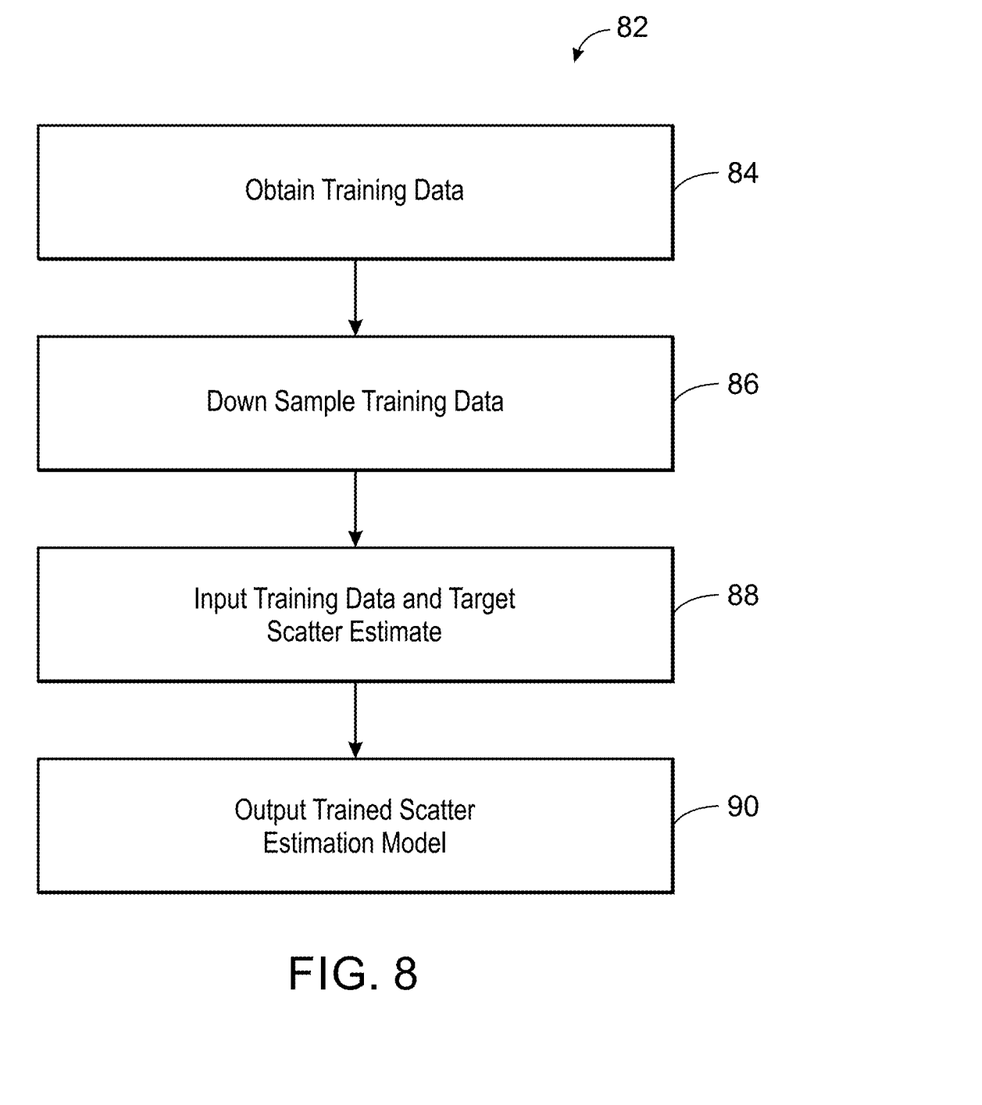
FIG. 8 is a flowchart of a method for training a scatter estimation model, in accordance with aspects of the present disclosure.

FIG. 8 is a flowchart of a method 82 for training a scatter estimation model. The method 82 may be performed by one or more components of the PET system 10 in FIG. 2 (acquisition circuitry, processing circuitry, etc.). One or more of the steps of the method 82 may be performed at a same time and/or in a different order from that depicted in FIG. 8.

Supervised learning may be utilized to train a scatter estimation model. The method 82 includes obtaining training data (block 84). The training data may be obtained from clinical examination data and/or phantom data. The training data includes emission sinograms and attenuation correction factor sinograms (e.g., u-maps). In certain embodiments, the method 82 includes downsampling (e.g., by a factor of 2, 4, 8 or another factor) the training data to increase speed and efficiency (block 86). The method 82 also includes inputting both emissions sinograms and attenuation correction factor sinograms (e.g., training data) and a target of scatter estimates (e.g., model-based scatter estimates) into a neural network (block 86). In certain embodiments, the neural network utilizes a U-NET architecture. The neural network finds patterns in the training data such that the input parameters (emissions sinograms and attenuation correction factor sinograms) correspond to the target. The method further includes outputting a deep learning-based scatter estimation model that can infer a scatter estimate (block 88).

Figure 9:
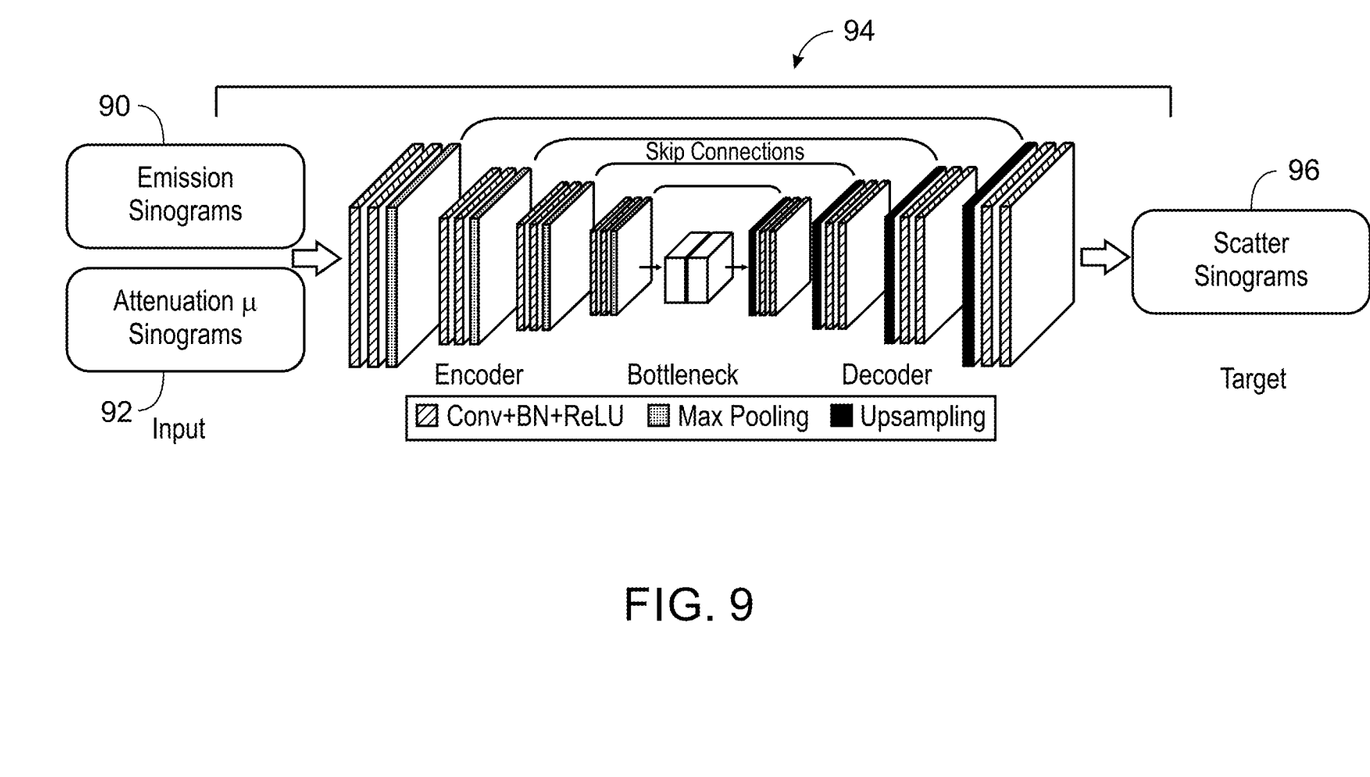
FIG. 9 is a schematic diagram for training a scatter estimation model, in accordance with aspects of the present disclosure.

FIG. 9 is a schematic diagram for training a scatter estimation model. As depicted in FIG. 9, an emission sinograms 90 and attenuation correction factor sinograms 92 are inputted into a neural network 94. In certain embodiments, the neural network 94 may be a convolutional neural network (CNN) having a U-NET architecture. The U-NET architecture is symmetric with the left half including a contracting path (e.g., constituted by a general convolutional process) and a right half including an expansive path (e.g., constituted by transposed 2D convolutional layers). A target 96 of scatter estimates (e.g., scatter sinograms or scatter distribution) is also provided. An algorithm may be utilized to calculate target scatter estimate. The neural network 94 finds patterns in the training data such that the input parameters (emissions sinograms and attenuation correction factor sinograms) correspond to the target 96.

Figure 10:
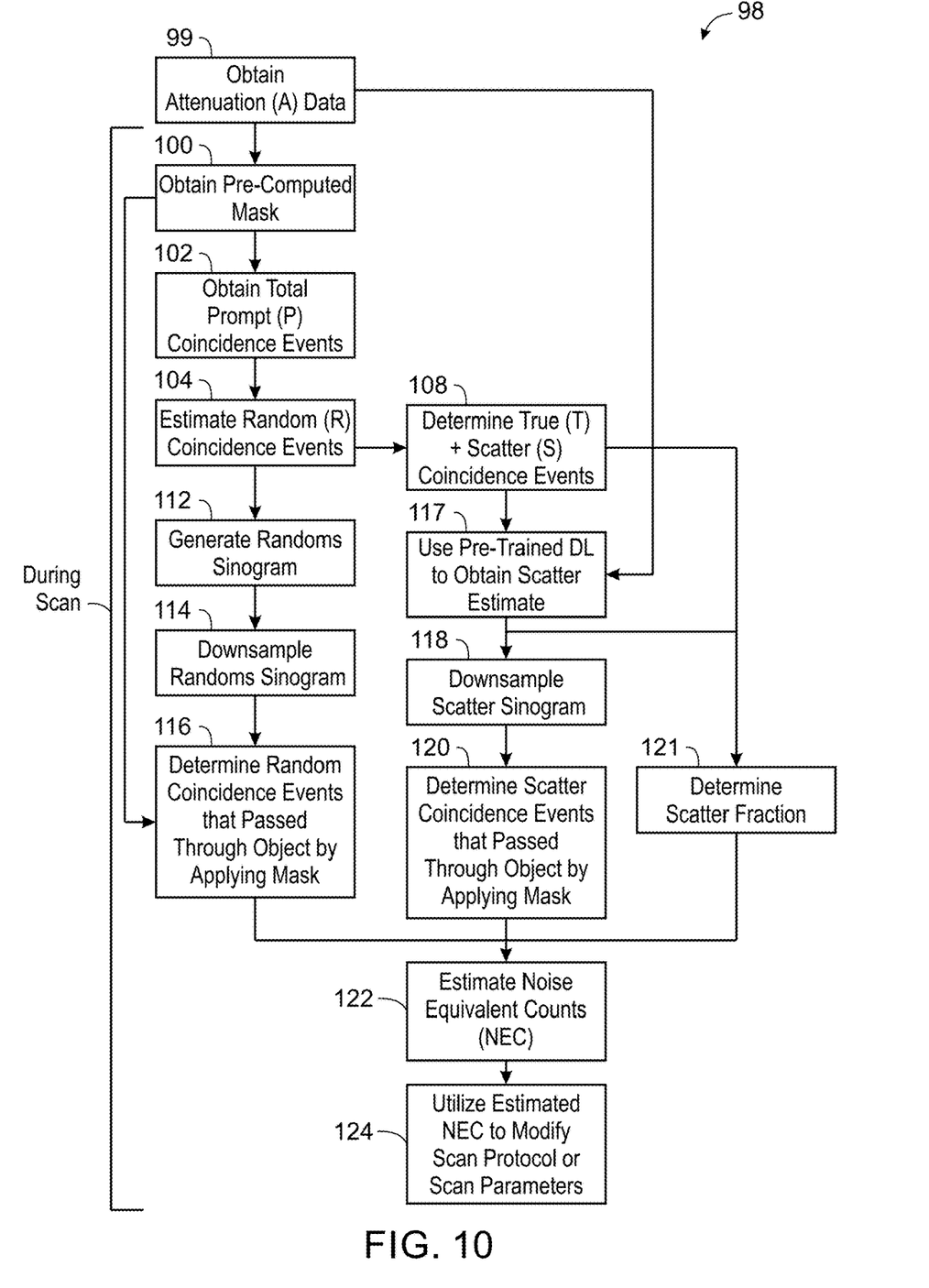
FIG. 10 is a flowchart of a method for estimating noise equivalent counts (e.g., utilizing an object mask), in accordance with aspects of the present disclosure.

FIG. 10 is a flowchart of a method 98 for estimating noise equivalent counts. The method 98 may be performed by one or more components of the PET system 10 in FIG. 2 (acquisition circuitry, processing circuitry, etc.). One or more of the steps of the method 98 may be performed at a same time and/or in a different order from that depicted in FIG. 10.

As indicated in FIG. 10, a number of steps of the method 98 occur one or more times during a PET scan (e.g., on-the-fly or in real time) of an object with a PET scanner (e.g., PET imaging system 10 in FIG. 2), where a plurality of coincidence events are detected by a detector array (e.g., detector array 12 in FIG. 2) of the PET scanner. In certain embodiments, the PET scanner includes a plurality of detectors rings disposed about a longitudinal axis of the PET scanner, where each detector includes a plurality of detectors.

The method 98 include obtaining attenuation (A) data from a CT scan of the object prior to the PET scan (block 99). The method 98 also includes obtaining a pre-computed mask of the imaged object, wherein the pre-computed mask is in sinogram space (block 100). As depicted, the pre-computed mask is obtained prior to the PET scan. In certain embodiments, the pre-computed mask is obtained during the scan. In certain embodiments, the pre-computed mask is obtained from the computed tomography scan of the object (block 99). In certain embodiments, the pre-computed mask was obtained from processed PET attenuation correction images (PIFA) of the object obtained by converting magnetic resonance (MR) images of the object acquired using MR sequences including zero echo time and Dixon.

The method 98 also includes obtaining a total of the plurality of coincidence events (e.g., prompt (P) coincidence events) detected by the detector array (block 102). The method 98 also includes estimating random (R) coincidence events detected by the detector array (block 104). In certain embodiments, the random coincidence events are estimated utilizing a randoms from singles algorithm.

The method 98 even further includes determining the sum of the estimated true (T) coincidence events and the scatter (S) coincidence events detected by the detector array (which represent the obtained emission data) based on the total of the plurality of coincidence events and the estimated random coincidence events (block 108). The sum of both the estimated true coincidence events and scatter coincidence events are determined by subtracting both the estimated random coincidence events from the total of the plurality of coincidence events (e.g., P−R=T+S). The method 98 yet further includes determining a scatter fraction based on the estimated scatter events and the estimated true coincidence events (block 110). The scatter fraction is determined by dividing the estimated scatter events by the sum of both the estimated scatter events and the estimated true coincidence events.

The method 98 includes generating a random sinogram based on the estimated random coincidence events (block 112). In certain embodiments, the method 98 also includes downsampling the random sinogram (e.g. to increase speed and efficiency) (block 114). The method 98 further includes determining the estimated random coincidence events that passed through the object during the scan by applying the pre-computed mask to the random sinogram (block 116).

The method 98 further includes estimating scatter coincidence events detected by the detector array and generating a random sinogram utilizing the pre-trained deep learning-based scatter estimation model as detailed in the method 62 in FIG. 6. (block 117). The deep-learning based scatter estimation model is trained to use the input of emission data (T+S) (e.g., in the form of an emission sinogram) and attenuation (A) data (e.g., in the form of attenuation correction factor sinogram) to generate the output scatter(S). In certain embodiments, the method 98 also includes downsampling the scatter sinogram (e.g. to increase speed and efficiency) (block 118). The method 98 further includes determining the estimated scatter coincidence events that passed through the object during the scan by applying the pre-computed mask to the scatter sinogram (block 120). The method 98 yet further includes determining a scatter fraction based on the estimated scatter events and the estimated true coincidence events (block 121). The scatter fraction is determined by dividing the estimated scatter events by the sum of both the estimated scatter events and the estimated true coincidence events.

The method 98 still further includes estimating the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan (block 122). For example, equation 2 can be utilized in estimating the noise equivalent counts when the pre-computed mask is available. In the absence of an object mask, equation 3 may be utilized and f can be set to 1 to simplify the equation. The method 98 yet further includes utilizing the estimated noise equivalent counts to modify a scan protocol or one or more scan parameters of the scan as the scan is occurring (block 124).

Technical effects of the disclosed subject matter include enabling estimation of noise equivalent counts during a PET scan. In addition, technical effects of the disclosed subject matter include enabling estimation of scatter during a PET scan. Technical effects of the disclosed subject matter further include enabling a site to have more real time information for predicting image quality. Technical effects of the disclosed subject matter even further include providing more real time data quality information to inform a site on how to modify scan procedures. Technical effects of the disclosed subject matter further include utilizing the disclosed techniques as part of a predictive model to determine per-body-segment imaging time based on the on-the-fly data estimation (i.e., estimated noise equivalent counts) given input of a protocol-based set of constraints on duration per location.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the invention, including making and using any devices or systems and performing any incorporated methods. The patentable scope of the present subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for estimating noise equivalent counts, comprising:
one or more times during a scan of an object with a positron emission tomography (PET) scanner, a plurality of coincidence events are detected by a detector array of the PET scanner:
obtaining, via a processor, a total of the plurality of coincidence events detected by the detector array;
estimating, via the processor, random coincidence events detected by the detector array;
estimating, via the processor, scatter coincidence events detected by the detector array;
estimating, via the processor, true coincidence events detected by the detector array based on the total of the plurality of coincidence events, the estimated random coincidence events, and the estimated scatter coincidence events;
determining, via the processor, a scatter fraction based on the estimated scatter events and the estimated true coincidence events;
estimating, via the processor, the noise equivalent counts based at least on the scatter fraction, the total of the plurality of coincidence events, the estimated true coincidence events, the estimated scatter coincidence events, and the estimated random coincidence events; and
obtaining, via the processor, a pre-computed mask of the object imaged during the scan, wherein the pre-computed mask is in sinogram space.

2. The method of claim 1, wherein the pre-computed mask was obtained from a computed tomography scan of the object.

3. The method of claim 2, wherein determining the estimated random coincidence events that have passed through the object during the scan comprises applying the pre-computed mask to the random sinogram.

4. The method of claim 3, wherein determining the estimated scatter coincidence events that have passed through the object during the scan comprises applying the pre-computed mask to the scatter sinogram.

5. The method of claim 4, further comprising downsampling, via the processor, both the random sinogram and scatter sinogram prior to determining the estimated random coincidence events and the estimated scatter coincidence events that have passed through the object during the scan.

6. The method of claim 1, wherein the pre-computed mask was obtained from processed PET attenuation correction images of the object obtained by converting magnetic resonance (MR) images of the object acquired using MR sequences including zero echo time and Dixon.

7. The method of claim 1, further comprising, during the scan:
generating, via the processor, a random sinogram based on the estimated random coincidence events;
generating, via the processor, a scatter sinogram based on the estimated scatter coincidence events;
determining, via the processor, the estimated random coincidence events that have passed through the object during the scan based at least on the random sinogram; and
determining, via the processor, the estimated scatter coincidence events that have passed through the object during the scan based at least on the scatter sinogram.

8. The method of claim 7, wherein estimating the noise equivalent counts comprises estimating the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan.

9. The method of claim 7, further comprising, during the scan:
generating, via the processor, an emission sinogram based on the plurality of coincidence events.

10. The method of claim 9, wherein estimating scatter coincidence events comprises:
inputting, via the processor, the emission sinogram and an attenuation correction factor sinogram into a trained deep learning-based scatter estimation model; and
outputting, via the processor, from the deep learning-based scatter estimation model the scatter sinogram.

11. The method of claim 10, further comprising down-sampling the emission sinogram and the attenuation correction factor sinogram prior to input into the deep learning-based scatter estimation model, and wherein the scatter sinogram is down-sampled.

12. The method of claim 10, further comprising training, via the processor, a neural network, via supervised learning, based on inputs of a target of scatter estimates and both emission sinograms and attenuation correction factor sinograms obtained from clinical examination data and/or phantom data to generate the trained deep learning-based scatter estimation model.

13. The method of claim 1, wherein the PET scanner comprises a plurality of detector rings disposed along a longitudinal axis of the PET scanner, and each detector ring comprises a plurality of detectors.

14. A system for estimating noise equivalent counts, comprising:
a memory encoding processor-executable routines;
a processor configured to access the memory and to execute the processor-executable routines, wherein the processor-executable routines, when executed by the processor, cause the processor to:
one or more times during a scan of an object with a positron emission tomography (PET) scanner, a plurality of coincidence events are detected by a detector array of the PET scanner:
obtain a total of the plurality of coincidence events detected by the detector array;
estimate random coincidence events detected by the detector array;
estimate scatter coincidence events detected by the detector array;
estimate true coincidence events detected by the detector array based on the total of the plurality of coincidence events, the estimated random coincidence events, and the estimated scatter coincidence events;
determine a scatter fraction based on the estimated scatter events and the estimated true coincidence events;
estimate noise equivalent counts based at least on the scatter fraction, the total of the plurality of coincidence events, the estimated true coincidence events, the estimated scatter coincidence events, and the estimated random coincidence events; and obtain a pre-computed mask of the object imaged during the scan, wherein the pre-computed mask is in sinogram space.

15. The system of claim 14, wherein the processor-executable routines, when executed by the processor, cause the processor, during the scan, to:

generate a random sinogram based on the estimated random coincidence events;

generate a scatter sinogram based on the estimated scatter coincidence events;

determine the estimated random coincidence events that have passed through the object during the scan by applying the pre-computed mask to the random sinogram;

determine the estimated scatter coincidence events that have passed through the object during the scan by applying the pre-computed mask to the scatter sinogram; and generate an emission sinogram based on the plurality of coincidence events.

16. The system of claim 15, wherein estimating the noise equivalent counts comprises estimating the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan.

17. The system of claim 16, wherein estimating scatter coincidence events comprises:

inputting the emission sinogram and an attenuation correction factor sinogram into a trained deep learning-based scatter estimation model; and outputting from the deep learning-based scatter estimation model the scatter sinogram.

18. A non-transitory computer-readable medium, the non-transitory computer-readable medium comprising processor-executable code that when executed by a processor, causes the processor to:

one or more times during a scan of an object with a positron emission tomography (PET) scanner, a plurality of coincidence events are detected by a detector array of the PET scanner:

obtain a total of the plurality of coincidence events detected by the detector array;

generate an emission sinogram;

estimate random coincidence events detected by the detector array and generate a random sinogram based on the estimated random coincidence events;

estimate scatter coincidence events detected by the detector array by inputting the emission sinogram and an attenuation correction factor sinogram into a trained deep learning-based scatter estimation model and outputting from the deep learning-based scatter estimation model a scatter sinogram;

determine the estimated random coincidence events that have passed through the object during the scan by applying a pre-computed mask of the object to the random sinogram, wherein the pre-computed mask is in sinogram space;

determine the estimated scatter coincidence events that have passed through the object during the scan by applying the pre-computed mask to the scatter sinogram;

estimate true coincidence events detected by the detector array based on the total of the plurality of coincidence events, the estimated random coincidence events, and the estimated scatter coincidence events;

determine a scatter fraction based on the estimated scatter events and the estimated true coincidence events; and estimate the noise equivalent counts based on the scatter fraction, the total of the plurality of coincidence events, the estimated random coincidence events, the estimated true coincidence events, the estimated scatter coincidence events that have passed through the object during the scan, and the estimated random coincidence events that have passed through the object during the scan.

* * * * *